United States Patent
Nagel

(10) Patent No.: US 7,471,895 B2
(45) Date of Patent: Dec. 30, 2008

(54) METHOD AND APPARATUS FOR OBTAINING STATUS INFORMATION CONCERNING OPTICAL AMPLIFIERS LOCATED ALONG AN UNDERSEA OPTICAL TRANSMISSION LINE USING COTDR

(75) Inventor: Jonathan A. Nagel, Brooklyn, NY (US)

(73) Assignee: Red Sky Subsea, Ltd., Chelmsford (GB)

( * ) Notice: Subject to any disclaimer, the term of this patent is extended or adjusted under 35 U.S.C. 154(b) by 576 days.

(21) Appl. No.: 11/031,518

(22) Filed: Jan. 7, 2005

(65) Prior Publication Data

US 2005/0196167 A1    Sep. 8, 2005

Related U.S. Application Data

(60) Provisional application No. 60/535,135, filed on Jan. 7, 2004.

(51) Int. Cl.
*H04B 10/08* (2006.01)
*H04B 10/17* (2006.01)
*H04B 17/02* (2006.01)

(52) U.S. Cl. .............................. 398/11; 398/18; 398/37; 398/177

(58) Field of Classification Search ........................ None
See application file for complete search history.

(56) References Cited

U.S. PATENT DOCUMENTS 5,552,881 A * 9/1996 Jezwinski et al. .......... 356/73.1

6,989,893 B1 * 1/2006 Asher et al. .................. 356/73.1
7,167,236 B2 * 1/2007 Suino .......................... 356/73.1
2002/0044314 A1 * 4/2002 Michishita .................... 359/110

FOREIGN PATENT DOCUMENTS

JP            09210847 A  *  8/1997

OTHER PUBLICATIONS

Gautheron, O. et al. "COTDR performance optimization for amplified transmission systems." IEEE Photonics Technology Letters, vol. 9, No. 7, Jul. 1997: 1041-1043.*
Healey, P. "Review of long wavelength single-mode optical fiber reflectometry techniques." Journal of Lightwave Technology, vol. 3, No. 4, Aug. 1985: 876-886.*

(Continued)

*Primary Examiner*—Kenneth Vanderpuye
*Assistant Examiner*—David S Kim
(74) *Attorney, Agent, or Firm*—Choate, Hall & Stewart LLP

(57) ABSTRACT

A method is provided for locating a fault in one or more optical amplifiers operating in saturation and located along an optical transmission path. The method begins by generating a coherent optical time domain reflectometry (COTDR) trace representing a backscattered and/or reflected optical power level along the transmission path and comparing the trace to a reference trace to generate a difference trace that represents a change in gain. The change in gain is assigned to at least one of the optical amplifiers based on the difference trace. The method comprises assigning the difference trace to faults in the optical amplifiers, equating the difference trace with a linear combination of difference trace vectors each arising from a fault in a different one of the optical amplifiers, and iterating to determine a coefficient value associated with each difference trace vector. Each nonzero coefficient value denotes a fault in an optical amplifier.

5 Claims, 4 Drawing Sheets

SAMPLE COTDR TRACES BEFORE AND AFTER FAULT, WITH DIFFERENCE TRACE

OTHER PUBLICATIONS

Horiuchi, Y. and M. Suzuki. "Data transport system architecture for scientific submarine cable." The 3rd International Workshop on Scientific Use of Submarine Cables and Related Technologies, 2003. Jun. 25-27, 2003: 185-190.*

* cited by examiner

SAMPLE COTDR TRACES BEFORE AND
AFTER FAULT, WITH DIFFERENCE TRACE

SAMPLE OUTBOUND FAULT DIFFERENCE TRACE

SAMPLE INBOUND FAULT DIFFERENCE TRACE

METHOD AND APPARATUS FOR OBTAINING STATUS INFORMATION CONCERNING OPTICAL AMPLIFIERS LOCATED ALONG AN UNDERSEA OPTICAL TRANSMISSION LINE USING COTDR

STATEMENT OF RELATED APPLICATION

This application claims the benefit of priority to U.S. Provisional Application Ser. No. 60/535,135, filed Jan. 7, 2004, entitled "Line Fault Location Algorithm".

FIELD OF THE INVENTION

The present invention relates generally to optical transmission systems, and more particularly to the use of an arrangement to allow coherent optical time domain reflectometry (COTDR) to be used to detect faults in the optical transmission path of an optical transmission system consisting of multiple spans of fiber and optical amplifiers.

BACKGROUND OF THE INVENTION

A typical long-range optical transmission system includes a pair of unidirectional optical fibers that support optical signals traveling in opposite directions. An optical signal is attenuated over long distances. Therefore, the optical transmission line will typically include repeaters that restore the signal power lost due to fiber attenuation and are spaced along the transmission line at some appropriate distance from one another. The repeaters include optical amplifiers. The repeaters also include an optical isolator that limits the propagation of the optical signal to a single direction.

In long-range optical transmission links it is important to monitor the health of the system. For example, monitoring can detect faults or breaks in the fiber optic cable, localized increases in attenuation due to sharp bends in the cable, or the degradation of an optical component. Amplifier performance should also be monitored. For long haul undersea cables there are two basic approaches to in-service monitoring: monitoring that is performed by the repeaters, with the results being sent to the shore station via a telemetry channel, and shore-based monitoring in which a special signal is sent down the transmission path or line and which is received and analyzed for performance data. Coherent optical time domain reflectometry (COTDR) is one shore-based technique used to remotely detect faults in optical transmission systems. In COTDR, an optical pulse is launched into an optical fiber and backscattered signals returning to the launch end are monitored. The time between pulse launch and receipt of a backscattered signal is proportional to the distance along the fiber to the source of the backscattering, thus allowing the fault to be located. In the event that there are discontinuities such as faults or splices in the fiber, the amount of backscattering generally changes and such change is detected in the monitored signals. Backscattering and reflection also occur from discrete elements such as couplers, which create a unique signature. The link's health or performance is determined by comparing the monitored COTDR trace with a reference record trace. New peaks and other changes in the monitored signal level are indicative of changes in the fiber path, normally indicating a fault.

One complication that occurs when COTDR is used in a multi-span transmission line in which the individual spans are concatenated by repeaters is that the optical isolators located downstream from each repeater prevent the backscattered and/or reflected signal from being returned along the same fiber on which the optical pulse is initially launched. To overcome this problem each repeater includes a bidirectional coupler connecting that repeater to a similar coupler in the opposite-going fiber, thus providing an optical path for the backscattered light so that it can be returned to the COTDR unit. In most DWDM links employing such a return path there may also be a filter immediately following the coupler so that only the COTDR signal is coupled onto the return path, thus avoiding interference that would occur if the signals from one fiber were coupled onto the return path fiber). Thus, signals generated by the backscattering and reflection of a COTDR pulse launched on one fiber are coupled onto the opposite-going fiber to be returned to the COTDR unit for analysis.

In addition to monitoring the health of the undersea cable, it is important to monitor the health of the optical amplifiers located in the repeaters. Typically, this monitoring is performed by the repeaters themselves, with the results being sent to the shore station via a telemetry channel. If instead COTDR could be used in-service to identify and locate optical amplifier faults, the telemetry channel could be eliminated.

Accordingly, it would be desirable to provide a method and apparatus for determining from COTDR traces the identity and location of one or more optical amplifier faults that arise along an optical transmission path.

SUMMARY OF THE INVENTION

In accordance with the present invention, a method is provided for locating a fault arising in one or more optical amplifiers from among a plurality of optical amplifiers operating in saturation and located along an optical transmission path. The method begins by generating a COTDR trace representing a backscattered and/or reflected optical power level along the transmission path and comparing the COTDR trace to a previously obtained reference COTDR trace to generate a difference trace. The difference trace is assigned to a fault in at least one of the plurality of optical amplifiers based on the difference trace.

In accordance with one aspect of the invention, the assigning step comprises the step of assigning the difference trace to faults in a plurality of the optical amplifiers. The method further includes the steps of equating the difference trace with a linear combination of difference trace vectors each arising from a fault in a different one of the optical amplifiers. An iteration process is performed to determine a value for a coefficient associated with each of the difference trace vectors. Each of the coefficients having a nonzero value denotes a fault in an optical amplifier corresponding to the difference trace vector with which the coefficient is associated.

In accordance with another aspect of the invention, the optical transmission path comprises first and second unidirectional transmission paths supporting opposite-going optical signals each having a plurality of the optical amplifiers located therealong.

In accordance with another aspect of the invention, the optical amplifiers comprise rare-earth doped optical amplifiers.

In accordance with another aspect of the invention, the linear combination of difference trace vectors includes difference trace vectors arising from a fault in each of the optical amplifiers located along the first transmission path and the second transmission path.

DETAILED DESCRIPTION OF THE INVENTION

The present inventor has recognized that COTDR techniques can be used to monitor the status of the optical amplifiers in addition to the status of the undersea cable.

Figure 1:
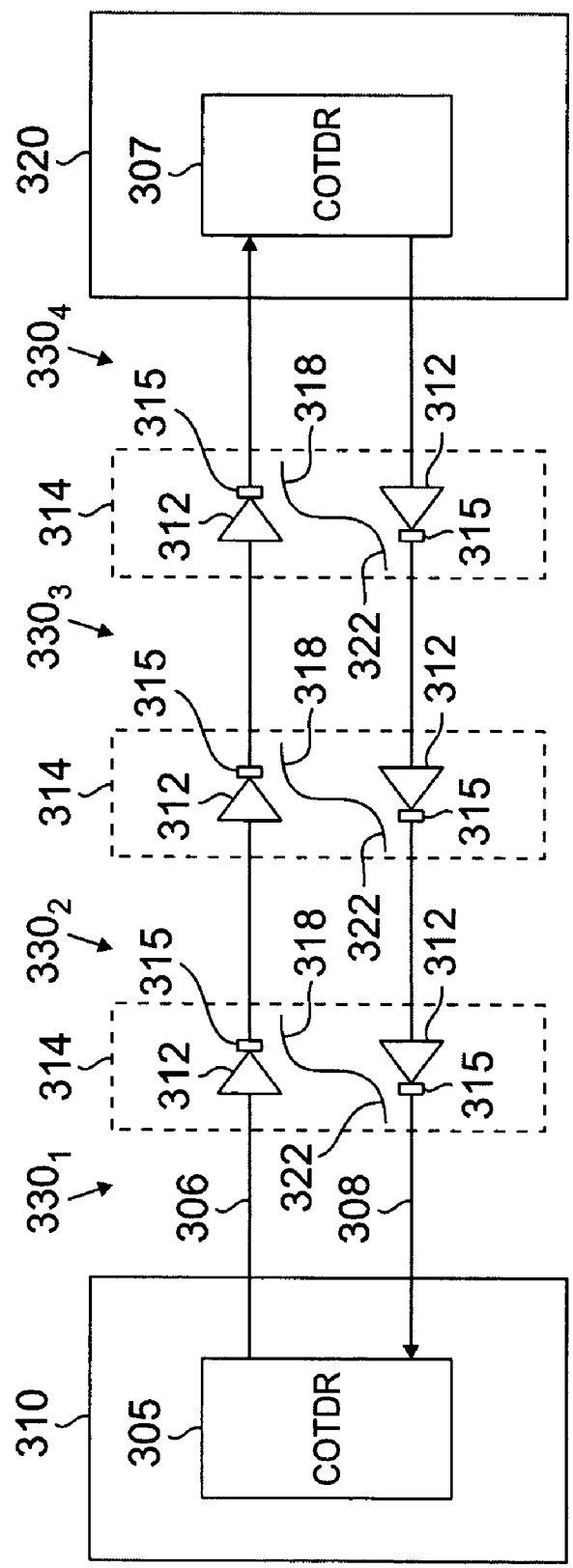
FIG. 1 shows a simplified block diagram of a transmission system that employs an COTDR arrangement constructed in accordance with the present invention.

FIG. 1 shows a simplified block diagram of an exemplary wavelength division multiplexed (WDM) transmission system in accordance with the present invention. The transmission system serves to transmit a plurality of optical channels over a pair of unidirectional optical fibers 306 and 308 between terminals 310 and 320, which are remotely located with respect to one another. Terminals 310 and 320 each include transmitting and receiving unit (not shown). The transmitting unit generally includes a series of encoders and digital transmitters connected to a wavelength division multiplexer. For each WDM channel, an encoder is connected to an optical source, which, in turn, is connected to the wavelength division multiplexer. Likewise, the receiving unit includes a series of decoders, digital receivers and a wavelength division demultiplexer. Each terminal 310 and 320 includes an COTDR unit 305 and 307, respectively.

Optical amplifiers 312 are located along the fibers 306 and 308 to amplify the optical signals as they travel along the transmission path. The optical amplifiers may be rare-earth doped optical amplifiers such as erbium doped fiber amplifiers that use erbium as the gain medium. As indicated in FIG. 1, a pair of rare-earth doped optical amplifiers supporting opposite-traveling signals is often housed in a single unit known as a repeater 314. The transmission path comprising optical fibers 306-308 are segmented into transmission spans $330_1$-$330_4$, which are concatenated by the repeaters 314. While only three repeaters 314 are depicted in FIG. 1 for clarity of discussion, it should be understood by those skilled in the art that the present invention finds application in transmission paths of all lengths having many additional (or fewer) sets of such repeaters. Optical isolators 315 are located downstream from the optical amplifiers 220 to eliminate backwards propagating light and to eliminate multiple path interference.

Figure 2:
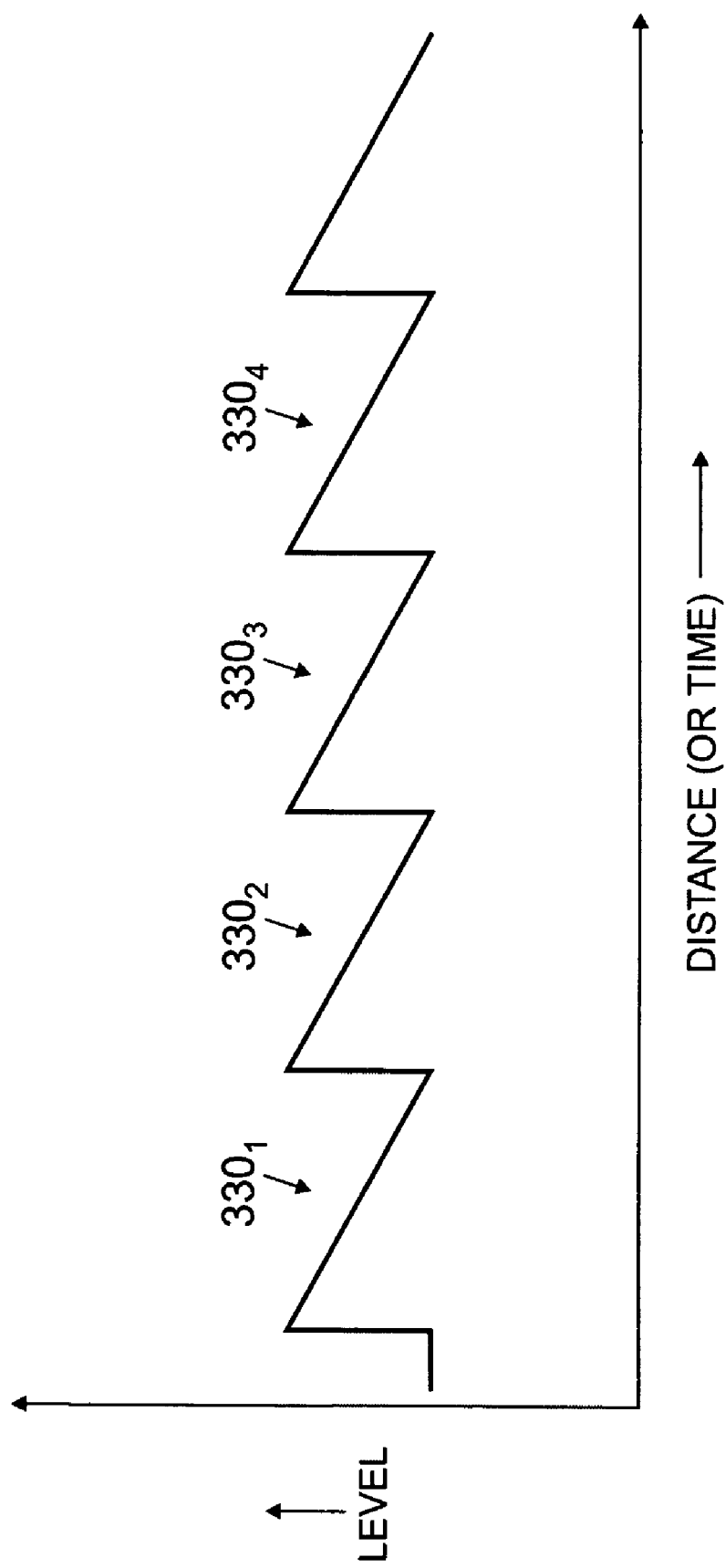
FIG. 2 shows a graphic display of a typical COTDR trace showing the backscattered power versus the distance from the COTDR for the transmission system depicted in FIG. 1.

Each repeater 314 includes a coupler arrangement providing an optical path for use by the COTDR. In particular, signals generated by reflection and scattering of the probe signal on fiber 306 between adjacent repeaters enter coupler 318 and are coupled onto the opposite-going fiber 308 via coupler 322. The COTDR signal then travels along with the data on optical fiber 308. COTDR 307 operates in a similar manner to generate COTDR signals that are reflected and scattered on fiber 308 so that they are returned to COTDR 307 along optical fiber 306. The signal arriving back at the COTDR is then used to provide information about the loss characteristics of each span. FIG. 2 shows a typical trace of the backscattered power on a logarithmic scale versus distance from the COTDR for the transmission spans $330_1$-$330_4$.

As previously mentioned, COTDR is usually employed to locate discontinuities in the optical fibers located in the undersea cable. This is accomplished by acquiring COTDR traces of the system at fixed time intervals. The COTDR traces reveal the gain performance of each optical amplifier, as given by the discontinuity beach each fiber loss profile. Thus both the gain and loss of the entire amplified transmission path can be represented by a single COTDR trace. The problem is how to interpret these traces to locate specific faults along the transmission path.

The COTR traces that are obtained are compared with a reference trace made at an earlier time and which represents the proper working state of the line. By subtracting the reference trace from the current trace, a difference trace of the changes is obtained. The present invention uses these same traces to locate faults that arise in the repeaters. As used herein, a repeater fault refers specifically to any change in the gain of the optical amplifiers located in the repeaters (other than a total loss of gain). For example, FIG. 3 shows a reference trace 410, a subsequent trace obtained after the occurrence of a repeater fault 420, and a difference trace 430.

Figure 3:
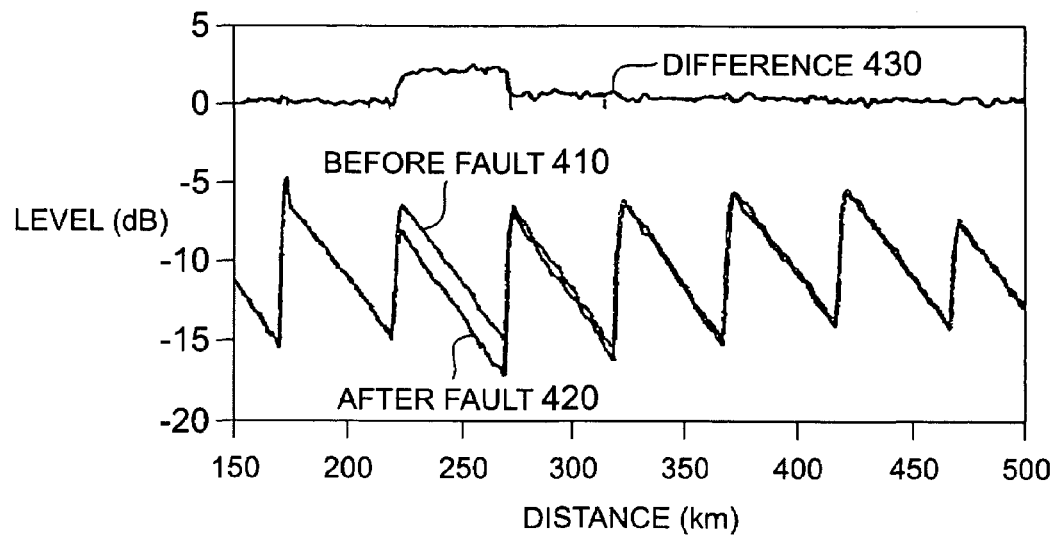
FIG. 3 shows an exemplary reference COTDR trace, a subsequent COTDR trace obtained after the occurrence of a repeater fault, and a difference trace.

The COTDR traces in FIG. 3 can be understood by recognizing that the optical amplifiers are typically operated in a state of compression or gain saturation in which a decrease in optical input power is compensated by increased amplifier gain. That is, in compression the amplifiers regulate the optical power of the signals propagating through the optical fiber. A series of optical amplifiers extending along a transmission path and operating in compression compensates for system degradations through a process of automatic gain adjustment. As a result, the optical output power from the amplifier remains at a substantially constant level even as the optical input power undergoes fluctuations. In other words, once the operating point (i.e., the point on the gain versus input power curve) of the optical amplifier has been determined, its output power will remain substantially constant, provided that the operating point corresponds to a state of compression or gain saturation. Accordingly, a decrease in the output power of a given EDF will not adversely affect overall system performance because the decrease will be compensated by a gain increase in subsequent downstream amplifiers.

FIG. 3 reflects this characteristic of a series of optical amplifiers operating in compression. As shown, a fault (i.e., a decrease in gain) occurs in the second repeater, which in this example is located at a distance of about 225 km from shore. The subsequent repeater, located at a distance of about 275 km, compensates for the majority of the decrease in gain of the previous repeater. The remaining gain loss is compensated in the remaining repeaters located along the transmission path. Accordingly, assuming fiber losses are constant, the difference trace 430 is about equal to zero (except for fluctuations caused by noise) along each span except for the span immediately downstream from the repeater in which the fault occurred, and, to a lesser extent, the next few downstream repeaters. Hence the difference trace is proportional to the gain change.

Figure 4A:
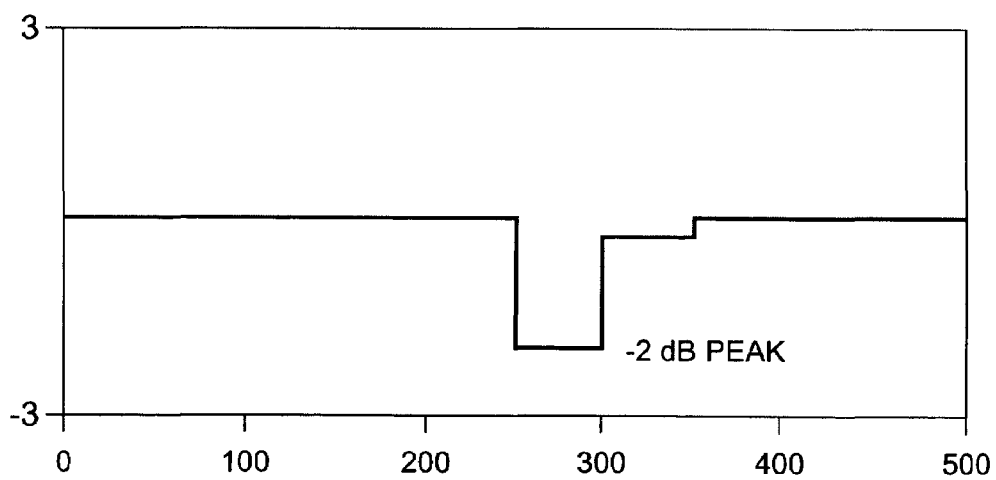
FIGS. 4a and 4b show exemplary difference traces for several possible repeater faults.
Figure 4B:
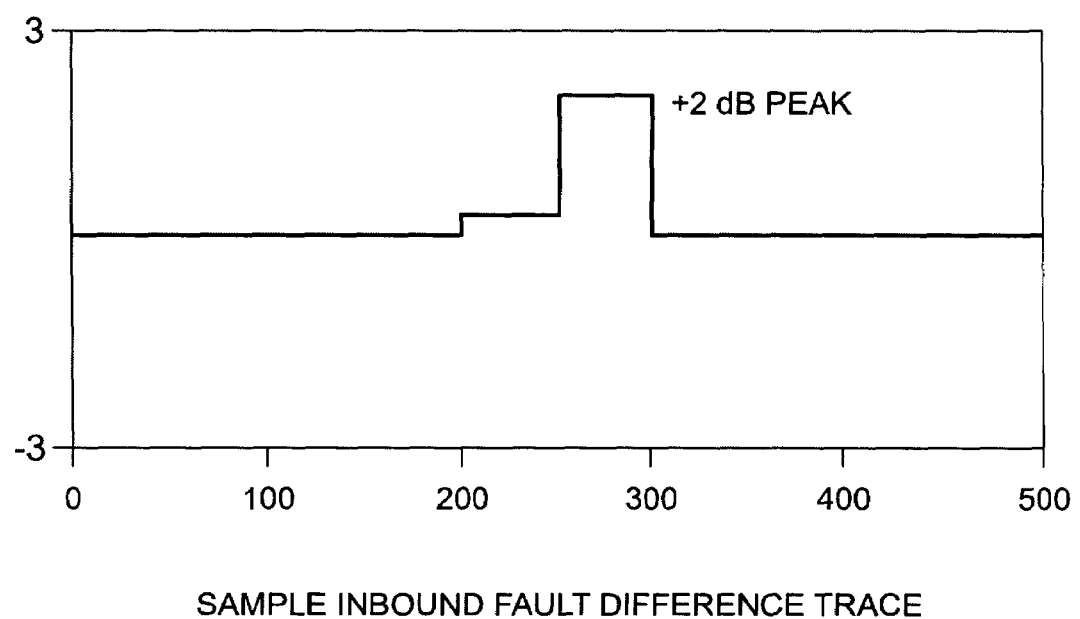

Each difference trace can be characterized by an N-dimensional vector, with the $i^{th}$ element given by the average magnitude of the difference between the current trace and the reference trace in span "i" out of a total of N spans. FIGS. 4a and 4b show exemplary difference traces for several possible repeater faults. The difference traces are assumed to each arise from a idealized single optical amplifier fault that is equal to a gain loss of 1 db. Further, all difference traces arising from the traces obtained from the forward or downstream transmission path, such as shown in FIG. 4a, are assumed to have the same shape. Likewise, all difference traces arising from the traces obtained from the backward or upstream transmission path, such as shown in FIG. 4b, are assumed to have the same shape. The actual gain loss arising from a single amplifier fault has the same shape as the idealized fault, but with an amplitude proportional to the magnitude of the actual gain loss. Finally, it is assumed that difference traces arising from multiple amplifier failures can be obtained by adding the individual difference traces for each isolated failure.

Given the aforementioned assumptions, the difference trace for any possible combination of multiple repeater faults can be represented by a linear combination of single repeater fault difference trace vectors:

$$\vec{f} = \sum_{i=1}^{N} c_i \vec{v}_i + \sum_{i=1}^{N} d_i \vec{u}_i$$

Here $\vec{f}$ is the vector representation of the actual measured difference trace, $\vec{v}_i$ and $\vec{u}_i$ are the single amplifier difference vectors for 1 dB gain losses at forward-going amplifier "i" and backward-going amplifier "i" respectively, and $c_i$ and $d_i$ are factors proportional to the actual single amplifier gain losses at forward-going amplifier "i" and backward-going amplifier "i".

The set of vectors $\vec{v}_i$ and $\vec{u}_i$ are each complete but non-orthogonal representations of the N-dimensional vector space. The vector $\vec{f}$ has N degrees of freedom, and the exact state of the amplifier chain is represented by the 2N degrees of freedom in the loss factors $c_i$ and $d_i$. Thus in general, the single difference trace measurement represented by $\vec{f}$ is not sufficient to fully characterize an arbitrary state of the amplifier chain.

Fortunately, not all states of the amplifier chain are equally likely. The most likely fault is a single amplifier fault, where only one of the 2N parameters has changed and the rest are steady. Therefore it is possible to use an iterative algorithm to correctly identify the fault.

To do this, the assumption is made that the fault arises from a single amplifier, that is, only one of the 2N parameters $c_i$ and $d_i$ are non-zero. A correlation method is used to determine which of the 2N state parameters is non-zero, for example $c_{22}$, and which value of $c_{22}$ provides the best fit to the actual difference trace. Such correlation methods are well known to those of ordinary skill in the art and thus will not be discussed further.

The next step in the iteration process is to subtract this assumed single amplifier failure $c_{22} \vec{v}_{22}$ difference trace from the actual difference trace to obtain an intermediate difference trace $\vec{f}\,'$. This intermediate difference trace is then assumed to be the result of a single point fault, and repeat the correlation process to determine the best fit of a single point fault to the intermediate difference trace. This process is continued until the intermediate trace is flat.

Once it has been determined that the difference trace is the result of a small number m of single amplifier faults (e.g., m<<2N) the parameters characterizing these single-point faults can be found either by using the same parameters used in the deconstruction process described above, or by using linear algebra techniques to deconvolve the difference trace.

The invention claimed is:

1. A method of locating a fault arising in one or more optical amplifiers from among a plurality of optical amplifiers operating in saturation and located along an optical transmission path, said method comprising the step of:

generating a coherent optical time domain reflectometry (COTDR) trace representing a backscattered and/or reflected optical power level along the transmission path;

comparing the COTDR trace to a previously obtained reference COTDR trace to generate a difference trace; and assigning the difference trace to a fault in at least one of the plurality of optical amplifiers based on the difference trace wherein the assigning step comprises the step of assigning the difference trace to faults in a plurality of the optical amplifiers, and further comprising the steps of:

equating the difference trace with a linear combination of difference trace vectors each arising from a fault in a different one of the optical amplifiers; and iterating to determine a value for a coefficient associated with each of the difference trace vectors, wherein each of the coefficients having a nonzero value denotes a fault in an optical amplifier corresponding to the difference trace vector with which the coefficient is associated.

2. The method of claim 1 wherein said optical transmission path comprises first and second unidirectional transmission paths supporting opposite-going optical signals each having a plurality of the optical amplifiers located therealong.

3. The method of claim 1 wherein said optical transmission path comprises first and second unidirectional transmission paths supporting opposite-going optical signals each having a plurality of the optical amplifiers located therealong.

4. The method of claim 1 wherein the optical amplifiers comprise rare-earth doped optical amplifiers.

5. The method of claim 3 wherein said linear combination of difference trace vectors includes difference trace vectors arising from a fault in each of the optical amplifiers located along the first transmission path and the second transmission path.

* * * * *